United States Patent [19]

Small et al.

[11] Patent Number: 4,562,233

[45] Date of Patent: Dec. 31, 1985

[54] PROCESS FOR PREPARING LIGHT COLORED PETROLEUM RESINS AND RESINS PRODUCED THEREBY

[75] Inventors: Augustus B. Small; Vincent L. Hughes; Francisco M. Benitez, all of Baton Rouge, La.

[73] Assignee: Exxon Research & Engineering Co., Florham Park, N.J.

[21] Appl. No.: 691,682

[22] Filed: Jan. 14, 1985

Related U.S. Application Data

[63] Continuation of Ser. No. 483,256, May 13, 1983, abandoned.

[51] Int. Cl.[4] ..................... C08F 2/00; C08F 10/100
[52] U.S. Cl. ..................................... 526/76; 526/237; 526/290
[58] Field of Search ..................... 526/290, 76, 237

[56] References Cited

U.S. PATENT DOCUMENTS

| | | | |
|---|---|---|---|
| 2,734,046 | 2/1956 | Nelson et al. | 526/76 |
| 2,750,353 | 6/1956 | Mirviss et al. | 526/290 |
| 2,750,359 | 6/1956 | Hammer et al. | 526/290 |
| 2,770,613 | 11/1956 | Tegge et al. | 526/237 |
| 2,817,647 | 12/1957 | Habeshaw et al. | 526/290 |
| 2,849,512 | 8/1958 | Banes et al. | 526/290 |
| 2,894,937 | 7/1959 | Banes et al. | 526/290 |
| 3,860,543 | 1/1975 | Masuda et al. | 526/290 |
| 3,875,095 | 4/1975 | Yamada et al. | 526/290 |
| 4,105,843 | 8/1978 | Iwase et al. | 526/77 |
| 4,230,840 | 10/1980 | Katayama et al. | 526/77 |

*Primary Examiner*—Harry Wong, Jr.
*Attorney, Agent, or Firm*—Roland A. Dexter

[57] ABSTRACT

Petroleum resins of lightened color while retaining satisfactory melting point and compatiblity are provided by a process which comprises heat soaking a petroleum cracking or reforming fraction containing cationically polymerizable hydrocarbons and from 2 to more than 0.5 weight percent of cyclodienes until the cyclodiene content is no more than 0.5 weight percent distilling said heat soaked petroleum fraction and polymerizing said distilled petroleum fraction in the presence of a polymerization catalyst.

2 Claims, No Drawings

PROCESS FOR PREPARING LIGHT COLORED PETROLEUM RESINS AND RESINS PRODUCED THEREBY

This is a continuation of application Ser. No. 483,256, filed May 13, 1983, now abandoned.

This invention relates to the production of low color hydrocarbon resins and to the products resulting therefrom.

BACKGROUND OF THE INVENTION

The processing of crude petroleum gives rise to various hydrocarbon fractions which may be subsequently "cracked" by heating, usually in the presence of steam to produce a range of lower boiling products.

U.S. Pat. No. 2,734,046 teaches that light colored resins can be produced from unsaturated petroleum fractions obtained by steam cracking when the fraction is substantially free of cyclic dienes by the use of an aluminum halide catalyst. Briefly, the broad concept of the teaching includes the following steps.

Petroleum fractions such as kerosene, gas oil, naphtha, etc. are cracked in the presence of steam at temperatures of about 530° C. to 815° C. to give highly unsaturated products. The liquid cut boiling largely below about $C_9$ is segregated and heated at about 90° to 140° C. to dimerize cyclopentadienes. Thereafter a $C_8$ to $C_9$ and lighter liquid cut including $C_5$ is taken overhead and there is separated a dimer concentrate as bottoms. The overhead stream, thus largely freed of cyclodienes to a level of about 2 weight percent is the raw material for making the resins. This stream is treated with an aluminum halide catalyst at about $-40°$ to 70° C. under conditions of good agitation. The resin thus formed may be recovered by water and/or alkali washing to remove catalyst followed by stripping off the unpolymerized material as is more fully taught in U.S. Pat. No. 2,770,613.

It then developed that this overhead stream which was largely freed of cyclodienes was better controlled in composition for the preparation of these aliphatic resins by fractionating the overhead stream which contained more than 3.5 weight percent isoprene to reduce the isoprene content to below about 3.5 weight percent, recovering said fraction reduced in isoprene content and having the following distillation analysis and composition:

|  | Weight Percent |
| --- | --- |
| Distillation | |
| I.B.P. $-38°$ C. | 0–15 |
| 38–70° C. | 25–50 |
| 70–130° C. | 35–70 |
| 130°+ | <5 |
| Composition | |
| Diolefins, Conj. | 11–25 |
| Aromatics | 18–41 |
| Paraffins | 0–5 |
| Olefins | 35–70 | and polymerizing said latter fraction in the presence of an aluminum halide catalyst at a temperature between $-40°$ to $+70°$ C. to produce a resinous product (see U.S. Pat. No. 2,894,937).

Although thhe resulting resins are of lighter color and have excellent softening points that were realized without the above-mentioned composition control step, the colors obtained are still too dark for many industrial applications provoked by technological developments in pressure sensitive adhesives for which petroleum resins modifying, e.g. tackifying, properties in the elastomer based formulations, and hot tack properties in the hot melt adhesive formulations based on ethylene polymers.

The literature also teaches the desirability of improving the color and thermal stability of aromatic hydrocarbon resins by reacting the resin feed stream with a dienophile, e.g. maleic anhydride, prior to polymerization (U.S. Pat. Nos. 4,105,843 and 4,230,840).

It is therefore an object of this invention to provide petroleum resins, particularly aliphatic, of much lighter color than presently available by an improved process for making said resins.

SUMMARY OF THE INVENTION

It has been discovered that heat soaking of the aforesaid fraction derived from steam cracked naphtha and having a cyclodiene content of about 2 weight percent to a cyclodiene content of less than about 0.5, preferably about 0.2, weight percent followed by distillation (whereby the dimers and codimers of said cyclodienes are separated from said heat soaked fraction) provides a fraction for polymerization that yields resins of lighter color.

Thus, in accordance with this invention there has been realized a process for producing a hydrocarbon resin having improved color and thermal stability, which comprises heat soaking a petroleum cracking or reforming fraction containing cationically polymerizable hydrocarbons and from 2 to more than 0.5 weight percent of cyclodienes until the cyclodiene content is no more than 0.5 weight percent, distilling said heat soaked petroleum fraction and polymerizing said distilled petroleum fraction in the presence of a polymerization catalyst.

More particularly, the invention is embodied in a process for the preparation of improved petroleum resins which comprises isolating a steam cracked hydrocarbon petroleum fraction boiling between about more than 20° C. to less than 140° C., said fraction being substantially below $C_9$, heating the steam cracked fraction at about 90° to 140° C. to dimerize the cyclodienes, stripping the resulting admixture to a temperature sufficient to separate an overhead product from the dimerized cyclodienes, recovering as the overhead product a stream boiling between about more than 20° C. to less than 140° C. and having the following composition:

|  | Weight Percent |
| --- | --- |
| Benzene | 15–30 |
| Toluene | 3–10 |
| $C_8$ aromatics | <1 |
| Diolefins | 11–25 |
| Olefins | 70–29 |
| Paraffins | 0–5 | said composition having a cyclodienes content of about 2 weight percent and more than 3.5 weight percent isoprene, fractionating said overhead product to reduce the isoprene content to below about 3.5 weight percent, recovering a fraction reduced in isoprene content and having the following distillation analysis:

| Distillation | |
|---|---|
| | Weight Percent |
| I.B.I. −38° C. | 0–15 |
| 38–70° C. | 25–50 |
| 70–130° C. | 35–70 |
| 130°+ | <5 | and polymerizing said latter fraction in the presence of an aluminum halide catalyst at a temperature between −40° C. to +70° C. to produce a resinous product, the improvement of reducing the cyclodiene content of said latter fraction to at least 0.5 weight percent prior to said polymerizing whereby a resin having a Gardner color of 4 or less is realized.

The resins realized by this improved process of the invention are a hydrocarbon resin comprising the reaction product of an aluminum halide-catalyzed polymerization of a heat soaked, steam cracked naphtha feed having at least the following properties: a softening point as determined by ASTM Procedure E-28 of from 85° to 100° C.; a color, Gardner of 4 or less when measured on a solution of equal weights of said resin and toluene; and a cloud point of less than 100° C. as measured by the temperature at which haze occurs in a cooling mixture of 20 weight parts of 60° C. melt point paraffin wax, 40 weight parts of ethylene vinylacetate copolymer and 40 weight parts of said resin.

As earlier discussed, it is well known to produce petroleum resins by Lewis Acid catalysis of highly unsaturated petroleum fractions produced from the steam cracking of petroleum gas oil fractions or heavy napthas. The resulting liquid cut boiling below about $C_9$ but containing components up to $C_{14}$ is segregated and heated at from about 90° to 140° C. to dimerize the cyclodienes. Thereafter a $C_8$ to $C_9$ and lighter liquid cut including $C_5$ is taken overhead and there is separated a dimer concentrate as bottoms. The overhead stream has a materially reduced content, i.e. about 2 weight percent, of cyclodienes, most usually cyclopentadiene and methyl cyclopentadiene.

This overhead stream is then fractionated to remove at least half of the isoprene containing fraction boiling below 38° C. and is the raw material, which is thereafter heat soaked in accordance with this invention to provide a feed material having a cyclodiene content of less than about 0.5 weight percent for making the superior resins of low color.

Table I shows the typical boiling characteristics of the overhead streams and the composition (as computed by Gas Chromatography).

TABLE I

Typical Boiling Characteristics For Overhead Streams

[Boiling range 20–140° C., predominantly 30–130° C. and containing 15 Wt. percent or less boiling below 38° C. (including 3.5 Wt. percent or less isoprene on the total stream)]

| Distillation Range | I.B.P. −38° C. | 0–15 Wt. % |
|---|---|---|
| | 38–70° C. | 25–50 Wt. % |
| | 70–130° C. | 35–70 Wt. % |
| | 130°+ | <5 |
| Composition Wt. %: | | |
| Diolefins, Conj. | | 11–25 |
| Isoprene | | 1.5–3.5 |
| Piperylene | | 7–15 |
| Cyclopentadienes | | 1.5–2.5 |
| Others | | 4–7.5 |
| Aromatics | | 18–41 |

TABLE I-continued

Typical Boiling Characteristics For Overhead Streams

[Boiling range 20–140° C., predominantly 30–130° C. and containing 15 Wt. percent or less boiling below 38° C. (including 3.5 Wt. percent or less isoprene on the total stream)]

| Benzene | | 15–30 |
|---|---|---|
| Toluene | | 0–5 |
| $C_8$ Aromatics | | <1. |
| Paraffins | 0–5 | |
| Mono-Olefins | 35–70 | |

These overhead streams are heat soaked at from 135° C. to 160° C., preferably 140° C. to 150° C., for up to 5, preferably from 3 to 5, hours whereby the cyclodiene content is reduced from about 2.0 to at least 0.5, preferably at least 0.2, weight percent. The heat soaked streams are distilled as by conventional methods capable of rejecting to the heavier fraction the dimers formed without heating the bottom stream sufficiently to re-crack the formed dimers whereby the resin feed stream is separated from the dimers and codimers of the cyclodienes to provide the resin feed streams polymerized into the resins of the invention according to the following discussion.

The resins feed streams are treated with an aluminum halide catalyst at about −40° C. to +90° C., preferably 20° C. to +60° C., under conditions of good agitation. The resin thus formed may be recovered by water and/or alkali washing to remove catalyst, followed by stripping of the unpolymerized material. However, other methods for removing the catalyst from the polymerized products may be used.

The washed resin solutions are then stripped of unreacted hydrocarbons boiling up to the end point of the feed naphtha, about 140° C. The resulting crude resin concentrate is then stripped under vacuum or with steam to remove liquid polymer and to recover a solid resin product having a softening point of 90° C. or higher and a cloud point of less than 100° C.

It is to be understood that this polymerization process can be carried out either in a batch or continuous manner.

The invention is described in more complete detail by the following examples although it is not intended to limit the scope of the invention thereto.

EXAMPLE 1

A typical cracked petroleum fraction of the prior art containing 3.5% isoprene and about 2% cyclopentadiene as well as smaller amounts of methylcyclopentadiene as described in Table I was treated by heat soaking the fraction at 138° C. for five hours. The cyclopentadiene content was reduced from 1.24% initially to 0.21% after heat treatment. The distilled product had about the same cyclopentadiene monomer content and the heavier dimers and codimers were eliminated. The compositions of the three streams are shown in Table II.

TABLE II

| Feed Components Stream | Initial A | After Heat Treating B | After Heat Treating and Distillation C* |
|---|---|---|---|
| Diolefin | | | |
| Isoprene | 1.25 | 1.06 | 1.21 |
| Piperylene | 14.0 | 11.84 | 13.8 |

TABLE II-continued

| Feed Components Stream | Initial A | After Heat Treating B | After Heat Treating and Distillation C* |
|---|---|---|---|
| CPD** | 1.24 | 0.21 | 0.2 |
| Dimers & codimers of cyclopentadiene | — | 1.55 | — |
| Monoolefins | 43.8 | 43.5 | 41.2 |
| Paraffins | 20.8 | 22.8 | 23.7 |
| Benzene | 18.9 | 18.9 | 11.3 |

*Stream C was 85% of B obtained overhead by distillation.
**CPD refers to cyclopendadiene when used herein.

The three cracked petroleum streams A, B, and C were each separately polymerized at 55° C. with 0.75 wt. % catalyst, $AlCl_3$ for 1 hour. The resulting polymerizates were stripped with heat and nitrogen to remove unreacted olefins and benzene, then stripped with stream at 250° C. until an equal amount of steam condensate was recovered, and the products were then evaluated for their properties with the following results.

TABLE III

| | Resin Properties | | |
|---|---|---|---|
| Resins From Feed Stream | A | B | C |
| Softening Point, °C.[a] | 106 | 96 | 98 |
| Color, Gardner[b] | 6 | 6− | 4 |
| Yield, % | 26.5 | 21.0 | 24.2 |
| Cloud Point[c] | 102 | 82 | 86 |

[a] ASTM E-26
[b] 50 wt. % resin solution in toluene
[c] The appearance of haze or "cloud" in a mix of 20 parts 60° F. melt point paraffin wax, 40 parts of Elvax ® 260 (ethylene vinylacetate) and 40 parts test resin heated to 200° C. and allowed to cool in air with stirring.

The resin from stream C was of markedly better color while retaining desirable softening point and cloud point properties. The cloud point measures the compatibility of the resin in polymers in which it may be commercially used, e.g., as Hot Melt Adhesives.

EXAMPLE 2

As pointed out earlier, the heat soaking of the overhead stream from the distillation tower (by means of which the isoprene content of the stream had been reduced to less than 3.5 weight percent isoprene) after admixture with raffinate (accrued from prior resin polymerizations by stripping) markedly reduces its cyclodiene content from about 1.5 to 2.5, typically 2, weight percent to a cyclodiene content of less than about 0.5 more usually about 0.25, preferably about 0.2, weight percent. This Example illustrates this teaching in Table IV wherein a resin feed is soaked at 149° C. and the resulting products were analyzed after heat soaking for the indicated time periods.

TABLE IV

| Feed Components | Start | 1 hr. | 1.5 hrs. | 3 hrs. | 4 hrs. |
|---|---|---|---|---|---|
| Isoprene | 3.04 | 2.85 | 2.70 | 2.6 | 2.5 |
| t-Pentadiene-1,3 | 10.95 | 10.70 | 10.4 | 10.1 | 9.9 |
| c-Pentadiene-1,3 | 7.48 | 7.31 | 7.2 | 7.1 | 6.9 |
| Cyclodienes | 1.82 | 0.6 | 0.31 | 0.22 | 0.2 |
| Dimers and Codimers of cyclodienes | 0.13 | 0.98 | 1.13 | 1.15 | 1.1 |

All other components are essentially unaffected.

EXAMPLE 3

It has been further discovered as appears from the following data in Table V that the color becomes lighter as the weight ratio of piperylene to CPD remaining after heat soaking and distillation in the resin feed increases above at least 50, preferably ≦100, to achieve highly regarded Gardner colors of 4 and less. When the ratio is raised to over 200, very light colors as low as 2 on the Gardner scale (50 Wt. % resin solution in toluene) can even be obtained. This can be seen by the following Examples. Three fractions containing the same ratio of cis- and trans-pentadiene 1,3 to cyclopentadiene monomer are heat soaked at 149° C. for up to five hours hours and then the piperylene-rich fraction is adjusted to approximately the same concentration to make hydrocarbon resin by polymerization. The comparative treatments and results are shown below:

TABLE V

| | Comparative Heat Soaking Experiments | | | | | |
|---|---|---|---|---|---|---|
| Stream | A | A¹ | B | B¹ | C | C¹ |
| Heat Soaked | No | Yes | No | Yes | No | Yes |
| Diolefins | | | | | | |
| Isoprene | 1.6 | 1.0 | 2.8 | 2.7 | 8 | 7.3 |
| c & t-pentadiene 1,3* | 9.0 | 8.9 | 15.2 | 15.1 | 46 | 44.5 |
| Cyclopentadiene | 0.9 | 0.21 | 1.6 | 0.23 | 4.1 | 0.18 |
| Monoolefins | 12.5 | 12.6 | 40.4 | 40.2 | 37.9 | 37.6 |
| Paraffins | 4 | 4 | 8 | 8 | 3 | 3 |
| Benzene | 63 | 63 | 32 | 32 | 1 | 1 |
| Toluene | 9 | 9.4 | — | — | — | — |
| Piperylene / cyclopentadiene | 10 | 42 | 9.5 | 65 | 11.2 | 247 |

*Combination also known as piperylene

The heat soaked steam cracked fractions above were polymerized after the following treatment. Stream A¹ was distilled to yield a light fraction boiling from 35° C. to 80° C. and containing all the diolefins and most of the monoolefins. This fraction was diluted with a diluent, largely benzene, free of cyclopentadiene. The diluent was obtained as raffinate from previous polymerizations. Stream B was distilled 85% overhead and polymerized as is; it had already been distilled to concentrate the diolefins and diluted with the same raffinate as A¹. C¹, the most concentrated in diolefins, had been prepared by first distilling the steam cracked stream to reject the dimers and was then diluted with the same diluent used in the other cases.

When the three product streams were polymerized the properties were those expected of the object resins of the invention. However, they differed in color. C¹ showed the best color, 2 Gardner. B¹ showed a color of 3.5 Gardner, while A¹ showed a Gardner color of 5. The untreated feeds, polymerized alone, showed colors of 5.5–6 Gardner. The following Table VI shows that to reach the desirable colors of 4 Gardner, the pentadiene, 1,3 to cyclopentadiene-ratio must be above 50, and the best results are obtained when the ratio reaches 200.

TABLE VI

| Polymerization Color Results | | | | |
|---|---|---|---|---|
| 55° C., 0.75 Wt. % $AlCl_3$, 1 Hr. Residence Time | | | | |
| Feed | A¹[a] | B¹ | C¹[b] | C[b] |
| Piperylene / Cyclopentadiene | 42 | 65 | 247 | 11 |

TABLE VI-continued

| Polymerization Color Results 55° C., 0.75 Wt. % AlCl₃, 1 Hr. Residence Time | | | | |
| --- | --- | --- | --- | --- |
| Feed | A¹⁽ᵃ⁾ | B¹ | C¹⁽ᵇ⁾ | C⁽ᵇ⁾ |
| Color Gardner | 5 | 3.5 | 2 | 6 |

⁽ᵃ⁾Distilled to take 25% overhead and then diluted with cyclopentadiene-free raffinate.
⁽ᵇ⁾Diluted with cyclopentadiene-free raffinate.

The invention in its broader aspect is not limited to the specific details shown and described and departures may be made from such details without departing from the principles of the invention and without sacrificing its chief advantages.

What is claimed is:

1. An aliphatic petroleum resin of light color possessing the combined essential properties of: a softening point as determined by ASTM Procedure E-28 of from 85° C. to 100° C.; a color, Gardner of 4 or less when measured on a solution of equal weights of said resin and toluene; and, a cloud point of less than 100° C. said cloud point being measured by the temperature at which haze occurs in a cooling mixture of 20 weight parts of 60° C. melt point paraffin wax, 40 weight parts of ethylene vinyl acetate copolymer and 40 weight parts of said hydrocarbon resin; and, being obtained from the aluminum halide-catalyzed polymerization of a heat soaked, steam cracked aliphatic naphtha feed having a boiling range of 38° C. to 70° C. and a cyclodiene content of less than at least 0.5 weight percent.

2. A resin according to claim 1 wherein said color ranges from a Gardner of 2 to 3.5.

* * * * *